(12) United States Patent
Cheng

(10) Patent No.: US 8,196,037 B2
(45) Date of Patent: Jun. 5, 2012

(54) METHOD AND DEVICE FOR EXTRACTING WEB INFORMATION

(75) Inventor: Kai Cheng, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 722 days.

(21) Appl. No.: 12/338,484

(22) Filed: Dec. 18, 2008

(65) Prior Publication Data

US 2009/0100056 A1    Apr. 16, 2009

Related U.S. Application Data

(63) Continuation of application No. PCT/CN2007/070096, filed on Jun. 11, 2007.

(30) Foreign Application Priority Data

Jun. 19, 2006    (CN) .................... 2006 1 0086427

(51) Int. Cl.
G06F 17/20    (2006.01)

(52) U.S. Cl. ........................................ 715/241

(58) Field of Classification Search .............. 715/241
See application file for complete search history.

(56) References Cited

U.S. PATENT DOCUMENTS

| | | | | |
|---|---|---|---|---|
| 6,662,190 B2* | 12/2003 | Bax et al. | | 707/809 |
| 6,732,102 B1* | 5/2004 | Khandekar | | 1/1 |
| 6,920,609 B1* | 7/2005 | Manber et al. | | 715/205 |
| 6,973,458 B1* | 12/2005 | Maeda et al. | | 1/1 |
| 7,669,119 B1* | 2/2010 | Orelind et al. | | 715/234 |
| 7,831,545 B1* | 11/2010 | Betz | | 707/603 |
| 2002/0052893 A1* | 5/2002 | Grobler et al. | | 707/509 |
| 2003/0115189 A1* | 6/2003 | Srinivasa et al. | | 707/3 |
| 2003/0140311 A1* | 7/2003 | Lemon et al. | | 715/513 |
| 2003/0194689 A1* | 10/2003 | Kamasaka et al. | | 434/350 |
| 2004/0030687 A1* | 2/2004 | Hidaka et al. | | 707/3 |
| 2004/0044963 A1* | 3/2004 | Uchiyama et al. | | 715/513 |
| 2004/0103371 A1 | 5/2004 | Chen et al. | | |
| 2004/0158799 A1* | 8/2004 | Breuel | | 715/513 |
| 2004/0199497 A1* | 10/2004 | Timmons | | 707/3 |

(Continued)

FOREIGN PATENT DOCUMENTS

CN    1567303 A    1/2005

OTHER PUBLICATIONS

Soderland, Learning to Extract Text-Based Information From the World Wide Web, AAAI KDD-97 Proceedings, 1997, p. 251-254.*

(Continued)

*Primary Examiner* — Laurie Ries
*Assistant Examiner* — Frank D Mills

(57) ABSTRACT

A method for extracting web information includes: selecting a number of Hypertext Markup Language, HTML, tags as tag ruler elements to generate a tag ruler from an HTML text of a web page according to sequence of the HTML text; matching the HTML text with the tag ruler elements in the tag ruler according to the sequence of the tag ruler elements in the tag ruler, segmenting web information according to matched HTML tags and saving web information segments and location information of HTML tags enclosing the web information segments in the HTML text; and determining location of HTML tags containing web information needed by a user in the HTML text, extracting web information segments corresponding to the web information needed by the user from the saved web information segments.

8 Claims, 2 Drawing Sheets

U.S. PATENT DOCUMENTS

| | | | | |
|---|---|---|---|---|
| 2004/0205548 | A1* | 10/2004 | Bax et al. | 715/513 |
| 2005/0050459 | A1 | 3/2005 | Qu et al. | |
| 2006/0047693 | A1* | 3/2006 | Kojima et al. | 707/102 |
| 2006/0288268 | A1* | 12/2006 | Srinivasan et al. | 715/505 |

OTHER PUBLICATIONS

Chen et al., Mining Tables From Large Scale HTML Texts, ACM Proceedings of the 18th conference on Computational lingustics, vol. 1, p. 166-172.*

Booker et al., Visualizing Text Data Sets, IEEE, Computing in Science & Engineering, 1999, p. 26-35.*

Myllymaki, Effective Web Data Extraction With Standard XML Technologies, Elsevier Science B.V., Computer Networks vol. 39, 2002, p. 635-644.*

Arasu et al., Exrtacting Structured Data From Web Pages, ACM, SIGMOD 2003, San Diego, CA, 2003, p. 337-348.*

International Search Report for International Application No. PCT/CN2007/070096, dated Sep. 20, 2007, and English translation thereof.

* cited by examiner

| Class | Name (Click to download a torrent file after installing BT application) | Forum | Source | Seed | Connection | Size | Publish time |
|---|---|---|---|---|---|---|---|
| Learning | CPA 2005 Learning material – Accounting, economic laws, tax laws, ISO, classical material | Relevant discussion | View | 147 | 734 | 1354M | 2006-2-13 23:48 |

Fig. 1

METHOD AND DEVICE FOR EXTRACTING WEB INFORMATION

CROSS-REFERENCE TO RELATED APPLICATIONS

This application is a continuation of International Application No. PCT/CN2007/070096 filed on Jun. 11, 2007. This application claims the benefit and priority of Chinese Application No. 200610086427.3, filed Jun. 19, 2006. The entire disclosures of each of the above applications are incorporated herein by reference.

FIELD

The present invention relates to Internet technologies, and particularly, to a method and device for extracting web information needed by a user from a web page.

BACKGROUND

This section provides background information related to the present disclosure which is not necessarily prior art.

Hypertext Markup Language (HTML) is a text markup language widely adopted on the World Wide Web (WWW). The HTML enables Web browsers to show web pages in a structured manner by using a series of marks.

For example, the following HTML text is shown in an INTERNET EXPLORER (IE) browser as the page in FIG. 1, which includes a table of 8 fields made up with the HTML.

```
<TR bgColor="#f2f8ff">
  <TD noWrap><a href="/search.aspx?q=learning&p=Seed&b=0">
  learning </a></TD>
  <TD><Ahref="http://www.cnplayer.com/
  upload/2006/2/13/20062132348359255123218.torrent"
  target=_blank>CPA2005 learning material-Accounting economic
  laws tax laws ISO classical material </A></TD>
  <TD noWrap><a href="http://bbs.fkee.com/"
  target=_blank> relevant discussion </a></TD>
  <TD><A href="http://www.cnplayer.com/bt/study/210591.htm"
  target=_blank> View </A></TD>
  <TD align="center"><b><font color=red>147</font></b></TD>
  <TD align="center"><b><font color=red>734</font></b></TD>
  <TD align="center"><font color=red>1354M</font></TD></TR>
```

In the preceding HTML text, tags including <TR></TR>, <TD></TD>, <A></A> are HTML tags. The characteristics of the HTML text include that information between tags <TR> and </TR> indicates information in a second row of the table shown in FIG. 1, information between each pair of <TD> and </TD> indicates a field in the table shown in FIG. 1 and every piece of information shown in a field of FIG. 1 is enclosed by the tags "><".

These characteristics are common characteristics which are not only shown in the preceding HTML text, but also in most of web pages in the form of tables. In some pages, different tags may be used, but the basic characteristics are always the same.

To sum up, HTML texts have the following basic characteristics:

1) the format of the HTML texts is indicated with tags;
2) the HTML texts have to follow certain grammar to express Web information with the tags;
3) in a web page in the form of a table, information enclosed by a pair of <TR> and </TR> indicates a row of the table;
4) in the web page in the form of the table, information enclosed by a pair of <TD> and </TD> indicates a field in a row of the table;
5) in the web page in the form of the table, every piece of information shown in the field is enclosed by tags "><"; and
6) the HTML tags are insensitive to cases.

A web browser parses the HTML tags and displays web information in a format designated by the tags. The HTML tags are a superset of a character set, i.e. a set of keywords. Different versions of browsers support different versions of HTML. When a browser is parsing HTML texts, the browser analyzes the grammar of the HTML texts first, executes dynamic content in the HTML texts and eventually displays formatted web information to a user.

A web browser has the following characteristics:

1) support to static pages composed with HTML texts;
2) support to other dynamic script languages, such as JavaScript, Dynamic HTML (DHTML), etc.;
3) support to the method for posting data by web clients to servers and getting data by the servers from the web clients;
4) support to dynamic web technologies, such as pages containing script codes (Active Server Pages, ASP), JSP, JaveBeans, etc. Wherein JSP is a dynamic web page standard promoted by Sun Microsystems and established by multiple corporations, and JaveBeans, belonging to a Java class, is an object having a certain function and being capable of processing a service by encapsulating attributes and actions;
5) grammar parse of the HTML texts only, without semantic analysis of the HTML texts; and
6) the functions of a web page display tool only, without classification and aggregation of the web information.

In practical applications, a user may need to extract appealing web information from web pages for classification and aggregation. The commonest methods for such purpose in the conventional method include analyzing contents of web files and analyzing information of the contents according to keywords therein. Such methods include keyword complete match method, keyword fuzzy match method and regular expression algorithm.

According to the basic theory of the keyword complete match method, a keyword to be matched is regarded as a string to be searched for and a web file to be processed is regarded as a source character string. The source web text is analyzed by using a string matching algorithm. Such method is suitable for the extraction of a small amount of information. When massive data shall be handled, the string matching algorithm costs too much time and provides poor extensibility.

The keyword fuzzy match algorithm is an improvement of the keyword complete match algorithm. Though the keyword fuzzy match algorithm provides better extensibility, it costs no less time.

The regular expression algorithm has no advantage in handling varieties of web information.

The common approach of the three methods is to parse the contents of the web information in order to extract the web information. However, algorithms of the three methods have high time complexity and poor extensibility.

SUMMARY

This section provides a general summary of the disclosure, and is not a comprehensive disclosure of its full scope or all of its features.

Embodiments of the present invention provide a method for extracting web information, which requires less time and provides better extensibility.

Embodiments of the present invention also provide a device for extracting web information, which requires less time and provides better extensibility.

The method of the present invention includes:

selecting a number of Hypertext Markup Language, HTML, tags as tag ruler elements to generate a tag ruler from an HTML text of a web page according to sequence of the HTML text;

matching the HTML text with the tag ruler elements in the tag ruler according to the sequence of the tag ruler elements in the tag ruler, segmenting web information according to matched HTML tags and saving web information segments and location information of HTML tags enclosing the web information segments in the HTML text; and determining location of HTML tags containing web information needed by a user in the HTML text, extracting web information segments corresponding to the web information needed by the user from the saved web information segments.

The device of the present invention includes:

a tag ruler generation module, adapted to select a number of Hypertext Markup Language, HTML, tags as tag ruler elements to generate a tag ruler from an HTML text of a web page according to sequence of the HTML text, and save the tag ruler;

a web information segmentation module, adapted to match the HTML text with the tag ruler elements in the saved tag ruler according to the sequence of the tag ruler elements in the tag ruler, segment web information with matched HTML tags and save web information segments and location information of the HTML tags enclosing the web information segments in the HTML text; and a web information extraction module, adapted to determine location of HTML tags enclosing web information needed by a user in the HTML text, and extract information segments corresponding to the web information needed by the user from the saved web information segments.

The present invention has the following technical advantages:

Embodiments of the present invention select a number of HTML tags as tag ruler elements to generate a tag ruler from an HTML text of a web page according to sequence of the HTML text, save the tag ruler, match the HTML text with the tag ruler elements in the saved tag ruler according to the sequence of the tag ruler elements in the tag ruler, segment web information according to the matched HTML tags, save web information segments obtained by the segmentation and location information of the HTML tags enclosing the web information segments in the HTML text, and then determine the location of the HTML tags containing the web information needed by a user in the HTML text, and search for and extract web information segments corresponding to the web information needed by the user from the saved web information segments. By creating the tag ruler with the HTML tags and segmenting the HTML text with the tag ruler, the present invention provides a more accurate and efficient information segmentation method and helps to make the information extraction algorithm more flexible and efficient.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a view of a table of 8 fields composed of HTML in the IE browser;

Corresponding reference numerals indicate corresponding parts throughout the several views of the drawings.

DETAILED DESCRIPTION

Example embodiments will now be described more fully with reference to the accompanying drawings.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

Embodiments of the present invention provide a method for extracting web information according to HTML grammar standard, which segments web page information and couples an information extraction algorithm and specific information contents to make the information segmentation and extraction algorithm more flexible and universal.

Figure 2:
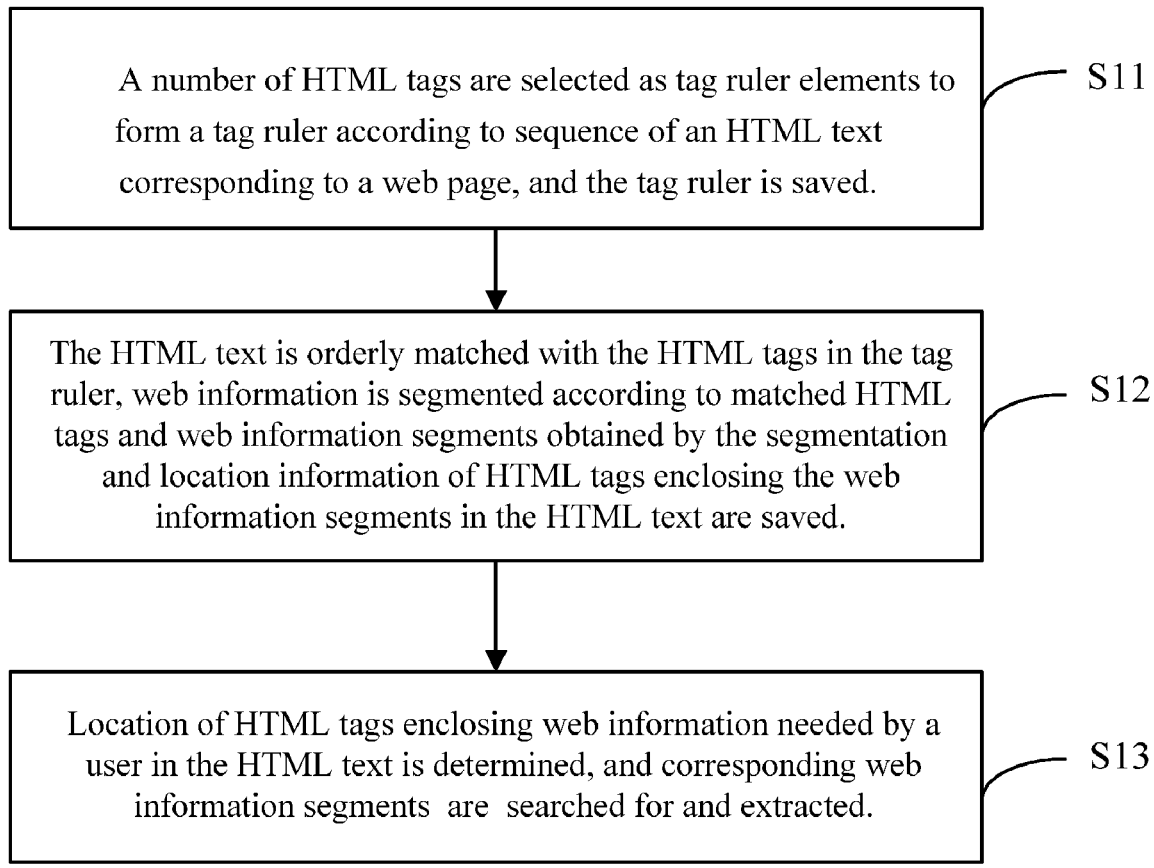
FIG. 2 is a flowchart of a method in accordance with an embodiment of the present invention.

A method provided by an embodiment of the present invention for extracting needed web information from a web page is shown in FIG. 2. The method includes the following processes.

Block S11: A number of HTML tags are selected as tag ruler elements to generate a tag ruler according to sequence of an HTML text corresponding to a web page, and the tag ruler is saved.

Block S12: The HTML text is orderly matched with the HTML tags in the tag ruler, web information is segmented according to matched HTML tags, web information segments obtained by the segmentation and location information of HTML tags enclosing the web information segments in the HTML text are saved.

Block S13: Location of HTML tags enclosing web information needed by a user in the HTML text is determined, and corresponding web information segments are searched for and extracted.

The present invention is especially suitable for web pages in the form of tables. By changing the tag ruler elements in the tag ruler, embodiments of the present invention can flexibly adjust the scale and standard of the segmentation of the web information, so that relevant information can be fast and efficiently extracted from the web pages.

Embodiments of the present invention format the web information tagged by HTML tags in the web information classification and aggregation process, and extract useful information from the web pages according to information extraction matrix and vector multiplication rules.

A detailed description of the method of the present invention is provided hereinafter with reference to an embodiment.

The method for extracting web information according to HTML tags and vector calculation includes the following processes.

Appealing information in a web page is extracted by using one or more HTML texts corresponding to a web page, a tag ruler designated by a user and an information extraction matrix as the input.

For example, when the HTML text given in the background of the invention is used as the information source, the tag ruler can be defined as:

<TR|<TD|</TD>|<TD|</TD>|<TD|</TD>|<TD|</TD>|<TD|</TD>|<TD|</TD>|<TD|</TD>|<TD|</TD>|/TR>|.

Wherein the tag ruler is segmented with "|" and includes "<".

When the tag ruler is used as an HTML tag vector to segment the HTML text, corresponding algorithm can be described as:

vector<string> FLAGLIST.

The content saved in the FLAGLIST is set according to the actual web information format. In this embodiment, the tag ruler can be defined as follows:

FLAGLIST fl, wherein the fl is instantiated as:

fl[0] = "<TR";
fl[1] = "<TD";
fl[2] = "</TD>";
...
fl[17] = "/TR>".

A tag set is created according to the tag ruler:
set<string> FLAGSET.

The tag set is used for determining whether the match of an HTML tag is a valid match while matching the HTML text with the tag ruler.

In this embodiment, the tag set can be defined as follows:
FLAGSET fs, wherein the fs is instantiated as:

fs[0] = "<TR";
fs[1] = "<TD";
fs[2] = "</TD>";
fs[3] = "/TR>".

The FLAGSET includes 4 elements.

The procedure of segmenting the web information according to the configured tag ruler is described as follows.

Match HTML tags in the HTML text orderly with tag ruler elements in the tag ruler. If an HTML tag matches a tag ruler element in the tag ruler, move to match the next HTML tag in the HTML text until all the tag ruler elements in the tag ruler are matched. In the matching process, the web information is segmented with matched HTML tags. The web information segments and the location information of the HTML tags enclosing the web information segments in the HTML text are saved.

If an HTML tag matches none of the tag ruler elements in the tag ruler, the location of the HTML tag in the HTML text shall be regarded as a break point. The HTML tags after the break point shall be orderly matched with the tag ruler elements in the tag ruler from the start of the tag ruler again.

Provided the web information segments and the location information of the HTML tags enclosing the web information segments are saved in stacks, the detailed matching and saving process is described as follows.

Firstly, a first tag ruler element of the FLAGLIST is searched in the HTML text. If the first tag ruler element is found, the tag and the location of the tag in the HTML text (the location of the tag is marked as pos1) are pushed into a stack. Then, a second tag ruler element of the FLAGLIST is searched in the HTML text after the pos1. If the second tag ruler element is found (the location of the second tag ruler element is marked as pos2), it shall be determined whether the information between pos1 and pos2 includes any of the tag ruler elements in the tag ruler. If the information between pos1 and pos2 does not include any of the tag ruler elements in the tag ruler, the second tag ruler element is matched successfully. The preceding steps shall be repeated to match the third, the fourth and all the following tag ruler elements in FLAGLIST until the last tag ruler element in the FLAGLIST is matched.

The preceding steps of judging whether the HTML tags have been successfully matched can be summarized as follows. The tag ruler elements in the tag ruler are obtained orderly. When an identical HTML tag is found in the HTML text, the location of each identical HTML tag in the HTML text is recorded. If the information between two adjacent locations does not include any of the tag ruler elements in the tag ruler, it is determined that the latter of the two adjacent HTML tags is matched successfully. The following is an example.

Acquire the Nth tag ruler element in the tag ruler (N is the index number of the tag ruler element in the tag ruler), search for an identical HTML tag in the HTML text. If the identical HTML tag is found, the location of the Nth HTML tag in the HTML text shall be marked as location N. The N+1th tag ruler element of the tag ruler shall be searched for in the HTML text after the location N. If an HTML tag identical to the N+1th tag ruler element is found, the location of the N+1th HTML tag in the HTML text shall be marked as location N+1. If all the tags between location N and location N+1 are not included in the tag set, the N+1th HTML tag shall be regarded as matched; otherwise the N+1th HTML tag shall be regarded as unmatched.

When a tag is regarded as unmatched in the process, all the information saved in the stack shall be popped out and the next round of tag ruler matching process shall start from the location of the unmatched HTML tag according to the sequential order of the tag ruler elements in the tag ruler, i.e. the information segmentation of next time is started with the first tag ruler element in the FLAGLIST.

When the amount of the information saved in the stack equals the length of the FLAGLIST, the information segmentation shall be regarded as completed and all the information in the stack shall be popped out and saved in a preset database.

The web information segments are obtained through the preceding steps.

A web information segment can be formatted into a field information (FieldInfo) object.

The user configures an information extraction matrix according to the needed web information and the information extraction matrix points out the location of the HTML tags enclosing the needed web information in the HTML text.

According to the information extraction matrix configured by the user and the vector multiplication rules, the web information needed by the user is extracted from the formatted FieldInfo object.

Taking the above HTML text and the tag ruler for example, the elements of the formatted FieldInfo object, which is defined as fi, include:

```
fi[0] = {"/search.aspx?q= learning &p=Seed&b=0", "learning" };
fi[1]={"http://www.cnplayer.com/upload/2006/2/
13/20062132348359255123 8218.torrent",
"CPA 2005 learning material - Accounting, economic laws, tax laws,
ISO, classical material" } ;
fi[2] = {"http://bbs.fkee.com/", "relevant discussion" };
fi[3] = {"http://www.cnplayer.com/bt/study/210591.htm", "View" };
fi[4] = {"147" } ;
fi[5] = {"734" } ;
fi[6] = {"1354M"} ;
fi[7] = {"2006-2-13 23:48"}.
```

The information extraction matrix configured by the user can be listed as follows:

| | | |
|---|---|---|
| 2 | 2 | 1 |
| 1 | 2 | 2 |
| 7 | 2 | 3 |
| 2 | 1 | 4 |
| 2 | 1 | 5 |
| 2 | 2 | 6 |

The information extraction matrix includes 3 columns. The first column on the left indicates a field in a row of the table from which web information shall be extracted. The numbers from the top to the bottom in the first left column of the information extraction matrix above are: 2, 1, 7, 2, 2, 2, which indicate that the user needs to orderly extract the information in the 2nd, 1st, 7th, 2nd, 2nd and 2nd fields in a row of the table.

The second left column of the information extraction matrix above indicates which information field tags in corresponding <TD></TD> in the HTML text are the HTML tags enclosing the web information. The numbers from the top to the bottom in the second left column of the information extraction matrix above are: 2, 2, 2, 1, 1, 2. In combination with the indication of the first left column of the information extraction matrix, the locations of the web information to be extracted should be determined.

The web information enclosed by the second "><" in the <TD></TD> for describing the second field in the HTML text should be extracted. Taking the HTML text mentioned above for example, the information to be extracted shall be "CPA 2005 learning material—Accounting, economic laws, tax laws, ISO, classical material".

The web information enclosed by the second "><" in the <TD></TD> for describing the first field in the HTML text should be extracted. Taking the HTML text mentioned above for example, the information to be extracted shall be "learning".

The web information enclosed by the second "><" in the <TD></TD> for describing the seventh field in the HTML text should be extracted. Taking the HTML text mentioned above for example, the information to be extracted shall be "1354M".

The web information enclosed by the first "><" in the <TD></TD> for describing the second field in the HTML text should be extracted. Taking the HTML text mentioned above for example, the information to be extracted shall be "http://www.cnplayer.com/upload/2006/2/13/20062132348359255123 8218.torrent".

The web information enclosed by the first "><" in the <TD></TD> for describing the second field in the HTML text should be extracted. Taking the HTML text mentioned above for example, the information to be extracted shall be "http://www.cnplayer.com/upload/2006/2/13/20062132348359255123 8218.torrent".

The web information enclosed by the second "><" in the <TD></TD> for describing to the second field in the HTML text should be extracted. Taking the HTML text mentioned above for example, the information to be extracted shall be "CPA2005 learning material—Accounting, economic laws, tax laws, ISO, classical material".

The third left column of the information extraction matrix indicates the storage order of the extracted web information in the database. The numbers from the top to the bottom in the third left column of the information extraction matrix above are: 1, 2, 3, 4, 5, 6, which indicate that the extracted web information should be orderly saved to generate an entry in the database.

When the vector calculation is adopted, the information extraction matrix mentioned above can be defined as typedef vector<vector<int>> KeyWordMapInfo. For example, when the information extraction matrix in the above example is defined as KeyWordMapInfo keymap, the elements therein shall be:

```
keymap[0][0] = 2; keymap[0][1] = 2; keymap[0][2] = 1;
keymap[1][0] = 1; keymap[1][1] = 2; keymap[1][2] = 2;
keymap[2][0] = 7; keymap[2][1] = 2; keymap[2][2] = 3;
keymap[3][0] = 2; keymap[3][1] = 1; keymap[3][2] = 4;
keymap[4][0] = 2; keymap[4][1] = 1; keymap[4][2] = 5;
keymap[5][0] = 2; keymap[5][1] = 2; keymap[5][2] = 6.
```

The extracted information shall be defined as a string vector, e.g.

typedef vector<string> VECRESULT; and vr is defined as an actual result vector object.

The elements of the vr after the vector calculation shall be:

```
vr[0] = "CPA 2005 learning material - Accounting, economic laws,
tax laws, ISO, classical material";
vr[1] = "Learning";
vr[2] = "1354M";
vr[3]="http://www.cnplayer.com/upload/2006/2/13/
20062132348359255123 8218.torrent";
vr[4]="http://www.cnplayer.com/upload/2006/2/13/
20062132348359255123 8218.torrent";
vr[5] = "CPA 2005 learning material - Accounting, economic laws, tax
laws, ISO, classical material".
```

To sum up, in embodiments of the present invention, a number of HTML tags as tag ruler elements are orderly selected to generate a tag ruler from a HTML text of a web page, and the tag ruler is saved. The HTML text is orderly matched with the HTML tag elements in the saved tag ruler, and the web information is segmented according to the matched HTML tags. The web information segments and the location information of the HTML tags enclosing the web information segments in the HTML text are saved. The location of the HTML tags containing the web information needed by a user in the HTML text is found, and the saved web information segments are searched for and extracted. By generating the tag ruler with the HTML tags and segmenting the HTML text with the tag ruler, embodiments of the present make the information segmentation more accurate and efficient.

According to embodiments of the present invention, the user can configure an information extraction matrix according to the needed web information. The information extraction matrix indicates the locations of the HTML tags enclosing the needed web information in the HTML text. The web information needed by the user is extracted from formatted web information object according to the information extraction matrix configured by the user and the vector multiplication rules, so that the information extraction algorithm can be more flexible and efficient.

Figure 3:
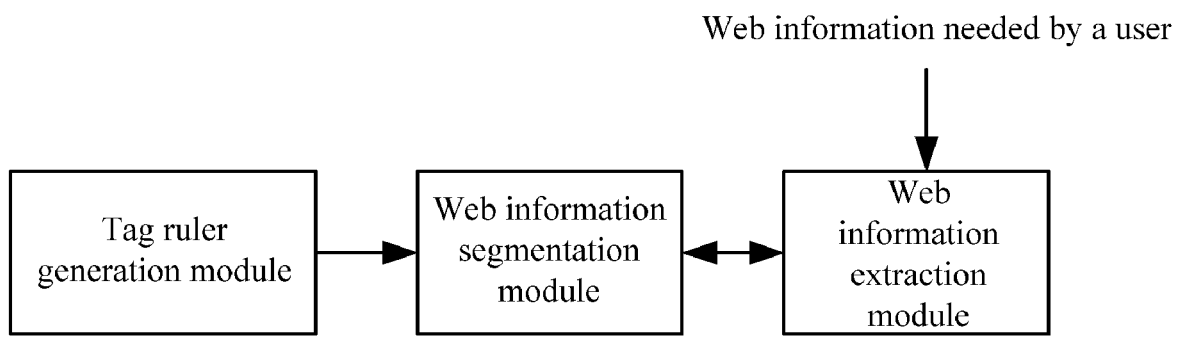
FIG. 3 is a schematic diagram illustrating the structure of a device in accordance with an embodiment of the present invention.

According to the method provided by embodiments of the present invention, an embodiment of the present invention also provides a device for extracting web information. FIG. 3 is a schematic diagram illustrating the structure of the device in accordance with an embodiment of the present invention. As shown in FIG. 3, the device includes a tag ruler generation module, a web information segmentation module and a web information extraction module.

The tag ruler generation module is adapted to select a number of HTML tags as tag ruler elements to generate a tag ruler from an HTML text according to the sequence of the HTML text corresponding a web page, and save the tag ruler.

The web information segmentation module is adapted to orderly match the HTML text with the HTML tag elements in the saved tag ruler, segment the web information according to the matched HTML tags and save the web information segments and the location information of the HTML tags enclosing the web information segments in the HTML text.

The web information extraction module is adapted to determine the location of HTML tags containing web information needed by a user in the HTML text, and search for and extract the web information segments.

The web information segmentation module is further adapted to format each web information segment segmented with the HTML tags into a FieldInfo object.

The web information extraction module is further adapted to configure an information extraction matrix according to the web information needed by the user. The information extraction matrix indicates the locations of the HTML tags enclosing the needed web information in the HTML text.

The web information extraction module is further adapted to extract the web information needed by the user from the formatted FieldInfo object according to the information extraction matrix configured by the user and the vector multiplication rules.

The foregoing are only preferred embodiments of this invention and are not for use in limiting this invention, any modification, equivalent replacement or improvement made without departing from the spirit and principles of this invention is included in the protection scope of this invention.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A method for extracting web information, comprising:
   selecting a number of Hypertext Markup Language, HTML, tags as tag ruler elements to generate a tag ruler from an HTML text of a web page according to sequence of the HTML text;
   matching the HTML text with the tag ruler elements in the tag ruler according to the sequence of the tag ruler elements in the tag ruler, segmenting web information according to matched HTML tags, and saving web information segments and location information of HTML tags enclosing the web information segments in the HTML text; and
   extracting web information needed by a user from the saved web information segments according to an information extraction matrix configured by the user and vector multiplication rules; wherein the information extraction matrix is configured by the user according to the web information needed by the user, and the information extraction matrix indicates location information of HTML tags enclosing the web information needed by the user in the HTML text;
   wherein the information extraction matrix comprises three columns;
   one column of data indicates a field in a row of the table from which the web information needed by the user is extracted;
   another column of data indicates which information field tags enclosed in a pair of <TD></TD> in the HTML text are the HTML tags enclosing the web information; and
   the other column of data indicates storage location of every extracted web information field in a database.

2. The method according to claim 1, wherein the tag ruler elements in the tag ruler comprise all HTML tags between a pair of <TR></TR> adapted to show a row of a table in the web page which is displayed in the form of the table.

3. The method according to claim 2, wherein matching the HTML text with the tag ruler elements in the tag ruler according to the sequence of the tag ruler elements in the tag ruler comprises:
   matching a HTML tag in the HTML text with a tag ruler element in the tag ruler according to the sequence of the tag ruler elements; and
   moving to match a next HTML tag in the HTML text when determining that the HTML tag matches a tag ruler element in the tag ruler until all the tag ruler elements in the tag ruler are matched.

4. The method according to claim 3, further comprising:
   taking location of an unmatched HTML tag in the HTML text as a break point when the HTML tag in the HTML text matches none of the tag ruler elements; and
   re-starting to match HTML tags after the break point with the tag ruler elements in the tag ruler according to the sequence of the tag ruler elements.

5. The method according to claim 3, wherein determining that the HTML tag matches a tag ruler element in the tag ruler comprises:
   acquiring a tag ruler element in the tag ruler according to the sequence of the tag ruler elements in the tag ruler;
   searching for an HTML tag identical with the tag ruler element in the HTML text;
   saving the location of the HTML tag in the HTML text; and
   determining that the latter HTML tag of identical HTML tags is matched when information between the adjacent locations of the identical HTML tags does not comprise a tag ruler element in the tag ruler.

6. The method according to claim 5, wherein saving the web information segments and the location information of the HTML tags enclosing the web information segments in the HTML text comprises: saving the web information segments and the location information of the HTML tags enclosing the web information segments in the HTML text in a stack; and the method further comprises:
   popping out all information in the stack when an HTML tag is unmatched.

7. The method according to claim 2, wherein the tag ruler is a tag list vector comprising multiple tag ruler elements.

8. The method according to claim 1, further comprising:

formatting every web information segment segmented by the HTML tags into a field information object; and the extracting web information needed by the user from the saved web information segments according to the information extraction matrix configured by the user and vector multiplication rules comprises:

extracting web information needed by the user from formatted field information objects according to the information extraction matrix configured by the user and vector multiplication rules.

\* \* \* \* \*